United States Patent [19]

Heiskari et al.

[11] Patent Number: 5,930,723
[45] Date of Patent: Jul. 27, 1999

[54] ESTABLISHING AN EXPANDED GROUP CALL IN A MOBILE COMMUNICATION SYSTEM

[75] Inventors: Mika Heiskari, Liminka; Mika Lehmusto, Kerava, both of Finland

[73] Assignee: Nokia Telecommunications OY, Espoo, Finland

[21] Appl. No.: 08/666,297

[22] PCT Filed: Oct. 17, 1995

[86] PCT No.: PCT/FI95/00570

§ 371 Date: Jun. 18, 1996

§ 102(e) Date: Jun. 18, 1996

[87] PCT Pub. No.: WO96/12376

PCT Pub. Date: Apr. 25, 1996

[30] Foreign Application Priority Data

Oct. 18, 1994 [FI] Finland .................................... 944887

[51] Int. Cl.⁶ .................................................. H04Q 7/38
[52] U.S. Cl. .......................... 455/518; 455/519; 455/520
[58] Field of Search .................... 455/507, 508, 455/517, 518, 519, 520, 524, 500, 521, 525, 527

[56] References Cited

U.S. PATENT DOCUMENTS

| | | | |
|---|---|---|---|
| 4,905,302 | 2/1990 | Childress et al. ...................... | 455/54.2 |
| 5,014,345 | 5/1991 | Comroe et al. . | |
| 5,077,828 | 12/1991 | Waldroup ................................ | 455/514 |
| 5,117,501 | 5/1992 | Childress et al. . | |
| 5,200,954 | 4/1993 | Teel, Jr. et al. .......................... | 455/520 |
| 5,235,631 | 8/1993 | Grube et al. . | |
| 5,263,176 | 11/1993 | Kojima et al. ........................... | 455/512 |
| 5,287,542 | 2/1994 | Hesse et al. . | |
| 5,465,391 | 11/1995 | Toyryla .................................... | 455/518 |
| 5,471,646 | 11/1995 | Schultz .................................... | 455/54.1 |
| 5,530,914 | 6/1996 | McPheters ............................... | 455/518 |
| 5,530,916 | 6/1996 | Schultz .................................... | 455/54.1 |
| 5,559,859 | 9/1996 | Dai et al. ................................. | 455/459 |
| 5,564,071 | 10/1996 | Liou et al. ............................... | 455/520 |
| 5,610,906 | 3/1997 | Schilling ................................. | 455/524 |
| 5,649,298 | 7/1997 | Ablay ...................................... | 455/520 |
| 5,659,881 | 8/1997 | Kent ........................................ | 370/329 |

OTHER PUBLICATIONS

MPT 1343, Performance Specification: System Interface Specification for radio units to be used with commercial trunked networks operating in Band III sub-bands 1 and 2, Jan. 1988, revised Sep. 1991.
MPT 1327, A Technical Overview of the United Kingdom PMR Trunking Standards.

*Primary Examiner*—Reinhard J. Eisenzopf
*Assistant Examiner*—Edan Orgad
*Attorney, Agent, or Firm*—Pillsbury Madison & Sutro LLP

[57] ABSTRACT

For establishing an expanded group call in a mobile communication system which has group call groups formed by a plurality of mobile stations, a network infrastructure which has at least one exchange, a plurality of base stations and telecommunication connections between them, and a group call database for maintaining data concerning group calls, an expanded group call set-up facility concerning a first group call group is activated in the group call database, the facility expanding the group call o concern at least one other group call group. The network infrastructure receives a group call set-up request concerning the first group call group, the network infrastructure checks whether an expanded group call setup facility has been activated for the first group call group, calls the mobile stations of the first group call group and the mobile stations (404) of each at least one other group call group to the expanded group call to be established, and guides the respective mobile stations to communicate on one traffic channel at each base station of the expanded group call.

11 Claims, 3 Drawing Sheets

ESTABLISHING AN EXPANDED GROUP CALL IN A MOBILE COMMUNICATION SYSTEM

This application claims benefit of International application PCT/FI95/00570, filed Oct. 17, 1995.

FIELD OF THE INVENTION

The invention relates to a method for establishing an expanded group call in a mobile communication system comprising group call groups formed by mobile stations, a network infrastructure comprising at least one exchange, base stations and the telecommunication connections between them, and a group call database for maintaining data concerning group calls.

The invention relates to mobile communication systems, especially mobile communication systems which comprise exchanges, base stations and radio phones, and which have a cellular structure and in each cell at least one base station communicating with at least one mobile station by means of one or more radio channels. One or several of the channels are typically used for signalling and the rest are utilized as traffic channels. The channels may be either time division or frequency division multiple access channels.

BACKGROUND OF THE INVENTION

The method according to the invention is intended for use especially in trunked networks, which are typically networks of companies or authorities wherein all channels are used by one or several user organizations. In addition to their own subscriber numbers, the subscribers in these networks also have group numbers, which indicate the group call group or subscriber group the subscriber belongs to, so that calls intended for subscribers of a particular group can be forwarded to the subscribers in question.

The invention is applicable in both mobile communication systems with a digital radio path and systems with an analog radio path. Analog mobile communication systems are described for example in the following publications by the British Department of Trade and Industry: "MPT 1327, January 1988, Revised and reprinted November 1991, A Signalling Standard for Trunked Private Land Mobile Radio Systems, Radio-communications Agency" and "MPT 1343, January 1988, Revised and reprinted September 1991, Performance Specification, Radiocommunications Agency".

A group call is one of the central functions of a private mobile radio communication system. A group call is used, for example, in all kinds of operations with several participants, especially when an entire group must be continuously kept up to date in regard to certain events. A group call is a conference call wherein all participants can speak in their turn and also hear each other. In group calls, the entire group is called by using a single call number. An individual radio unit, such as a mobile station or a radio phone, i.e. a subscriber station, may belong to several groups that are programmed into the radio unit. The programming may be fixed, but the user of the mobile station may also change it. The system stores a file of the base stations associated with each group number. A group call may cover one, several or all base stations within the area of a mobile exchange, or several mobile exchanges. When a group call is being established, a traffic channel is reserved from all base stations belonging to the group, and each of these base stations transmits a group call message comprising a group number and information about the reserved traffic channel. If the mobile station identifies the group number contained in the group call message, it moves to the traffic channel indicated in the group call message. Therefore it is in principle always possible to engage a mobile station in a group call if the mobile station is within the area of operation predetermined for the group and if it is not already engaged in another group call.

In the following, the operation of a mobile communication system employing group calls is illustrated in a normal situation by means of FIG. 1. In a normal situation, mobile stations must be able to communicate in a group call group comprising all radio phones and the dispatcher of the dispatching area (FIG. 1). For example, radio phones 111, 112 and 113 and dispatcher A in AREA 1 belong to group call group R1, and when they call each other they use the identifier of the group call group R1, i.e. they dial the number R1. The other dispatching areas AREA 2 and AREA 3 operate in the same manner with their own call group identifiers R2 and R3.

FIG. 2 shows an example of the operation of a mobile communication system during an expanded group call, i.e. for example during night dispatching. Not all dispatchers are needed during such quiet periods of the user organization, for example at night, wherefore dispatching areas can be combined. FIG. 2 illustrates the combining of dispatching areas so that the dispatchers A and B have stopped operating and the group calls R1 and R2 previously under their control, as well as the corresponding geographical areas AREA 1, AREA 2,have been placed under the control of dispatcher C. In this application, night dispatching and an expanded group call hereinafter refer to a situation where dispatcher groups have been combined.

In a prior art system, night dispatching is realized, for example in such a manner that, in addition to the number of its own dispatcher group, the memory of mobile station also comprises the before-programmed number of the night dispatcher group. During night dispatching, radio phones dial the night dispatcher number. The drawback is that the users of the mobile stations must know exactly when to dial the number of their own dispatcher group, versus when is dial the number of the night dispatcher group. Also, it is then necessary to program beforehand into a radio phone the night dispatcher number, i.e. the group call number of an expanded group call, which is naturally difficult.

Another way of implementing the night dispatching or expanded group call facility is that separate dispatcher groups are interconnected in the mobile communication system so that it is always possible to dial the same dispatcher group number. Small dispatcher groups thereby still operate within their own areas.

The disadvantage of this arrangement is that the radio phones, i.e. mobile stations, may then operate only within their own small dispatching area. In prior art systems, the problem has been solved by programming the numbers of all small dispatcher groups into all radio phones of the night dispatcher groups. However, this always requires advance preparations and a lot of work, as well as expert programming of all mobile stations. In such a case, the user of a mobile station must decide himself or herself in which group call he or she wants to participate within each dispatching area, i.e. group call area. The disadvantage of the arrangement is that forming and changing the night dispatcher groups and areas is difficult, since the programming must be performed in each radio phone.

Another drawback is that when this arrangement is used, it is necessary to reserve several radio channels from each radio cell, i.e. base station, for the expanded group call to be established, which necessarily wastes radio resources both in the form of channels and radio units maintaining them.

The functions of call diversion, i.e. call forwarding, and immediate call diversion that are shown in FIG. 3 are generally known in telephone technology. Call forwarding refers to a function by means of which calls to a subscriber can be transferred to the exchange or to another subscriber. FIG. 3 shows a first mobile station, i.e. subscriber A, 301, an exchange 304, a second mobile station 303, and a third mobile station 302.

In normal call forwarding, subscriber A 301 performs a call set-up request 305, i.e. performs an individual call to establish a connection. Since the call forwarding facility is now activated, the exchange 304 then sets up two calls: call 1 306 between subscriber A and the exchange, and call 2 307 between subscriber C receiving the call to be transferred and the exchange. The exchange 304 connects these calls, and subscribers A and C may communicate with each other. The prior art call forwarding is reasonable in a wire network and also in individual calls in mobile communication systems. No call forwarding of group calls is known in prior art systems. If the prior art call forwarding were utilized in group calls, radio channel capacity would be wasted since two group calls must be established: the original requested group call and the new group call to which the original call is connected. If the group call groups that are to be connected to the same call are situated within the same geographical area in the mobile communication system, each group call must be provided with its own channel capacity at least partly within the same geographical areas, which in turn wastes channel capacity.

A mobile communication system implemented in the manner described above would work well if during an expanded group call to be established in a dispatching, for example night dispatching situation, the mobile stations would only have to communicate with the dispatchers. But if the mobile station initiating the call wants to set up a group call, i.e. if it must be able to communicate both with the dispatcher and with all other mobile stations belonging to the same group call group and situated in the area, the above-described arrangement is not sufficient.

SUMMARY OF THE INVENTION

The purpose of the present invention is to avoid the problems of the above-described prior art arrangements.

The aim of the invention is to achieve a method and equipment providing a call forwarding method for a subscriber initiating a group call in a mobile communication system. The purpose is to provide a method wherein when subscriber A wants to initiate the first group call, in reality a second group call is started, i.e. call forwarding is performed in the group call.

The aim is to provide call forwarding in a group call in such a way that it is not necessary to reserve several channels at the same base stations for one group call established by means of call forwarding.

This new type of method for establishing an expanded group call in a mobile communication system is achieved with the method according to the invention, which is characterized in that, in the method, an expanded group call set-up facility concerning the first group call group is activated in a respective group call database, the facility extending the group call to concern at least one other group call group, the network infrastructure receives a group call set-up request concerning the first group call group, the network infrastructure checks whether an expanded group call set-up facility has been activated for the first group call group, calls the mobile stations of the first group call group and the mobile stations of at least one other group call group to the expanded group call to be established, and guides the mobile stations to communicate on one traffic channel at each base station of the expanded group call.

The invention also relates to a mobile communication system comprising group call groups formed by mobile stations, a network infrastructure comprising at least one exchange, base stations and the telecommunication connections between them, and a group call database for maintaining data concerning group calls.

The mobile communication system according to the invention is characterized in that in the system an expanded group call set-up facility concerning the first group call group is activated in a respective group call database, the facility extending the group call to concern at least one other group call group, the network infrastructure is adapted to check, in response to the group call set-up request concerning the first group call group, whether an expanded group call set-up facility has been activated for the first group call group, to call the mobile stations of the first group call group and the mobile stations of at least one other group call group to the expanded group call to be established, and to guide the mobile stations to communicate on one and the same traffic channel.

The invention is based on the idea that in realizing the expanded group call function, a call set-up request concerning the establishment of the first group call is changed to another group call request. By means of this request, a new group call concerning desired subscribers is established instead of the group call that was requested but will not be set up.

In protecting the invention, a group call set-up request is changed to another group call set-up request in such a way that a single radio resource is reserved at each base station in the system.

The advantage of such a mobile communication system and a method for establishing an expanded group call in a mobile communication system is that they solve the problems of the prior art arrangements.

Another advantage of the invention is that there is no need to program the mobile stations, i.e. radio phones, separately when the expanded group calls, i.e. dispatching areas, change.

A further advantage of the invention is that the users of mobile stations can always dial the same group call number regardless of the combining of the group calls, i.e. dispatching areas. Therefore the user does not have to know which dispatcher or group call request is being used at any given time.

An additional advantage of the invention is that if the dispatcher (dispatching point, control point) of a group call is damaged, a new dispatcher can be configured fast for the group call.

The invention is especially advantageous in mobile communication systems with several groups of users. When one user group is less active, another group may have a peak time in radio traffic. Such mobile communication systems often include especially private mobile radio systems used by the authorities. It is then possible to flexibly transfer radio resources at a given moment to the use of a user group which then has a peak time from a group call group that is less active. This means for example that it is possible to increase, for instance at night, the number of group call groups and subscribers participating in one group call, i.e. in group calls from which resources are to be taken.

BRIEF DESCRIPTION OF THE DRAWINGS

In the following, the invention will be described in greater detail with reference to the accompanying drawings, in which.

DETAILED DESCRIPTION OF PREFERRED EMBODIMENTS OF THE INVENTION

The expanded group call function according to the invention differs from the call forwarding function generally known in phone technology in such a way that in the arrangement according to the invention the new number is identifiable in the transmitted radio path signalling both to subscriber A initiating the call and to subscribers to be invited to the group call. On the other hand, in prior art call forwarding, the exchange sets up two separate calls, which appear separate in radio path signalling and which are connected together in the exchange. Therefore the prior art arrangement requires at least two channels.

Figure 3:
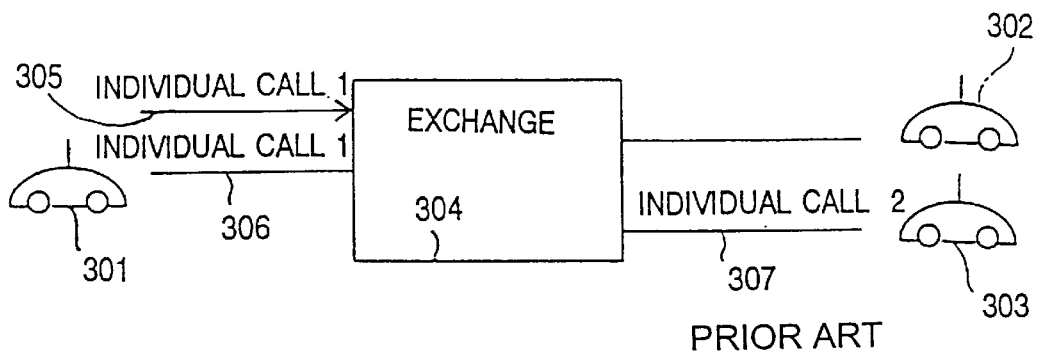
FIG. 3 shows prior art call forwarding in case of an individual call.

FIG. 3, described in the background part of the specification above, discloses the difference between the traditional call forwarding function and the function according to the invention. In conventional call forwarding, two separate radio connections are reserved, whereas in the implementation of the invention only one connection is reserved, which saves radio resources.

According to the invention, in case of an expanded group call the mobile communication system directs calls arriving from radio phones with the number of certain group calls, for example small dispatcher groups, to the number of a combined expanded group call group. The memory of each mobile station, for example a radio phone, contains programmed at least the number of its own dispatcher group, and in the first embodiment of the invention also the number of the night dispatcher group, i.e. expanded group call group. In the second embodiment of the invention, the only identifier which must be programmed into the first mobile station, i.e. subscriber A, is the identifier of the group call group the first mobile station is calling.

Figure 1:
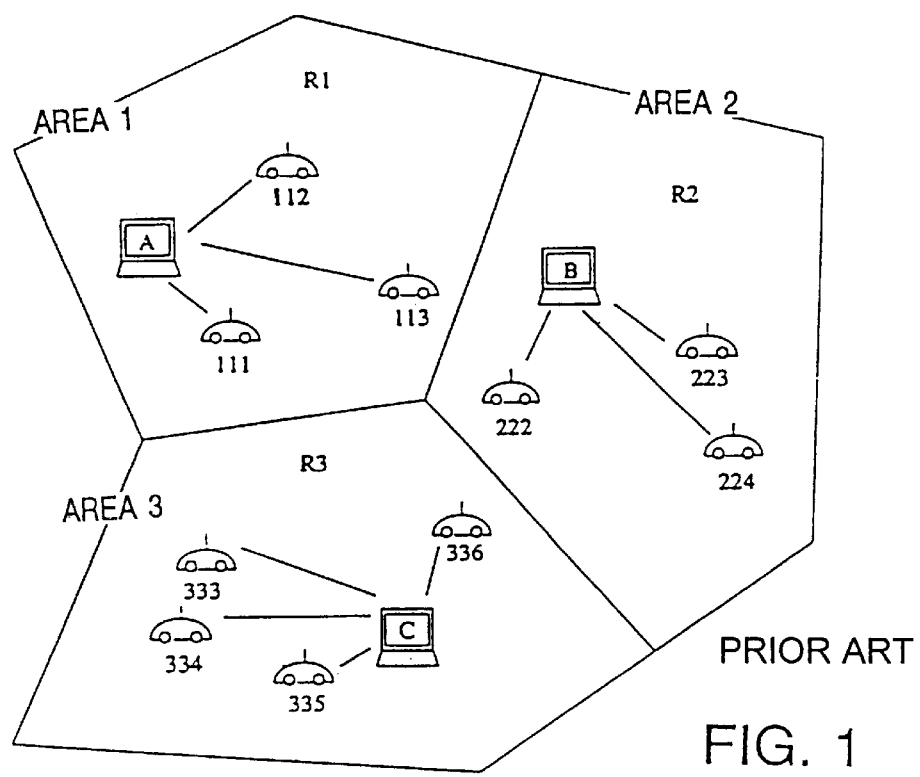
FIG. 1 shows dispatching areas and group calls set up in the areas in a normal situation.
Figure 2:
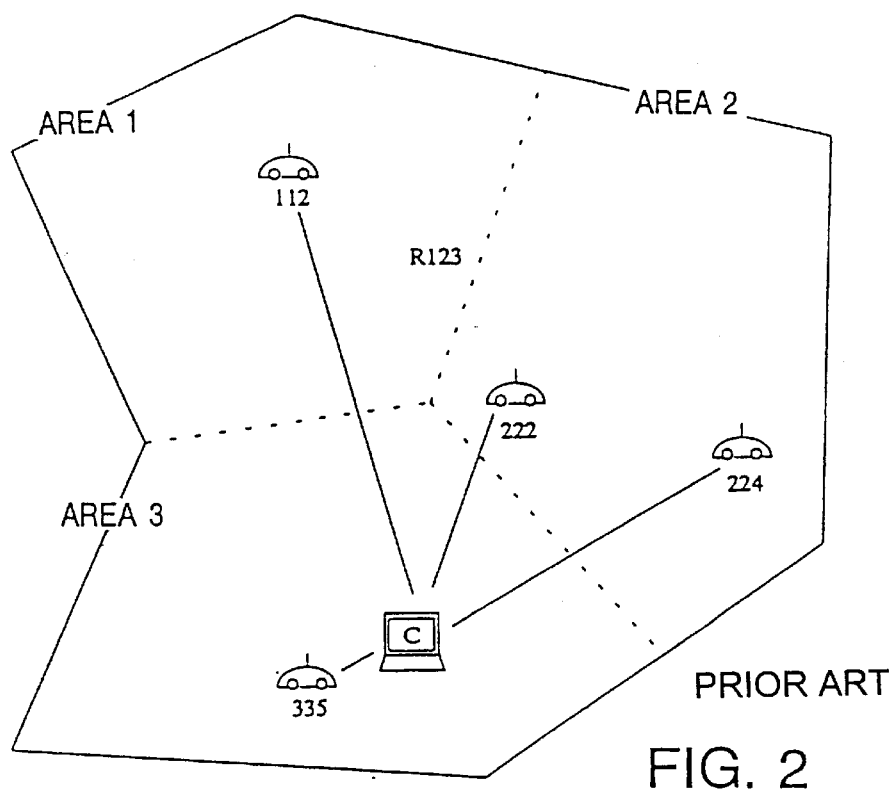
FIG. 2 shows combined dispatching areas and a group call set up in the areas in a situation of night dispatching.

In FIG. 2 described above in the beginning of the specification, if the mobile station 224 makes its own group call R2 trying to reach, for example, dispatcher B by utilizing the group call number or phone number R2, the mobile communication system establishes an expanded group call R123, which is a combination of the group calls of groups R1, R2 and R3.

According to the invention, radio phones still dial the numbers they utilize during normal operation, i.e. 112 dials R1, 222 dials R2, etc. Therefore the mobile stations 112, 222, etc, do not need to know the identifier of the new expanded group call, but it is sufficient for them to call their own original group call groups.

Figure 4:
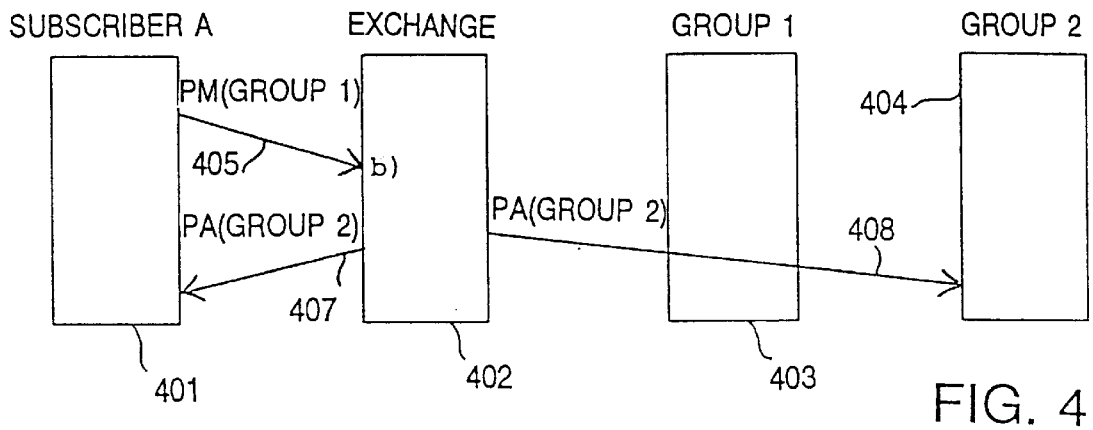
FIG. 4 is a functional diagram of the method according to the invention for establishing an expanded group call in a mobile communication system.

FIG. 4 is a functional diagram of the method according to the invention for establishing an expanded group call in a mobile communication system. The figure shows the first mobile station 401, i.e. subscriber A, which initiates a call. The figure also shows an exchange 402, which describes the network infrastructure of the mobile communication system. The figure also shows in the form of blocks the first group call group 403, i.e. group 1, and the expanded group call 404, i.e. group 2, to be established according to the invention.

When the method according to the invention is applied, the first mobile station 401 transmits a group call set-up request 405 to the exchange 402. The exchange checks the expanded group call set-up table of its group call database to find out whether an expanded group call set-up facility has been activated for the group call, and if it has, the exchange sets up an expanded group call 404 by transmitting a go-to-channel command 408 by means of which the desired subscribers are guided to the expanded group call to be established. The same command 408 is also transmitted 407 to the aforementioned first mobile station 401.

In the following, the activation of the above-described night dispatching or expanded group call facility is disclosed according to the first embodiment of the invention. The facility is activated in such a way that a mobile station, i.e. a mobile station, a control point or some other terminal equipment or entity of the mobile communication system, transmits to the mobile communication system a message to activate the expanded group call facility. The activation message contains at least the following fields:

1. the identifier of the calling party,
2. a message identifier indicating that the message concerns the activation of the area group call facility,
3. a list of group numbers covered by the area group call facility, and
4. the identifier of the night dispatcher group, i.e. the expanded group call, i.e. the group number; the system knows beforehand the area of operation of the group in question.

When a mobile communication system has received an activation message it interprets it. If the calling party has the right to activate the night dispatching facility, i.e. the expanded group call, and all group numbers exist and can be connected by means of the expanded group call facility to the expanded group call group in question, the mobile communication system activates the expanded group call facility, for example the night dispatching facility. Otherwise, the message brings about no actions or it causes a negative acknowledgment to be sent. In the activation, the groups and the group number of the expanded group call group mentioned in the expanded group call message are stored in the group call database. The mobile communication system then transmits an acknowledgment message to the terminal equipment. The acknowledgment is positive if the expanded group call facility is activated and negative if no activation has been performed.

In the following, the operation of the expanded group call facility, e.g. night dispatching facility, of the first embodiment of the invention is described. In the beginning, a mobile station, for example a radio phone or some other terminal equipment, transmits a group call set-up request to the mobile communication system. The mobile communication system then interprets the received message and checks whether the group identifier requested in the received message is stored in the expanded group call set-up table according to the invention or not. If it is not, operation continues as usual and only the group call that was requested is established. If, on the other hand, the identifier of the requested group call is in the table, the method is continued in the following way. The mobile communication system, typically the exchange of its network infrastructure, reserves one traffic channel within the operation area of the expanded group call. The exchange of the mobile communication system then sets up an expanded group call in the operation area of the expanded group call. All group call groups mentioned in the expanded group call table are then called to the same expanded group call in the operation area of the call.

The elimination of the expanded group call facility according to the first embodiment of the invention is described below. A mobile station, a control point or some other terminal equipment in the mobile communication system transmits to the system a message to eliminate the expanded group call facility. The aforementioned message contains at least the following fields:

1. the identifier of the calling party,
2. a message identifier indicating that the message concerns the elimination of the area group call facility, and
3. the group number of the expanded group call group.

The mobile communication system interprets the received message. If the calling party has the right to eliminate the expanded group call facility, the system eliminates the facility. Otherwise, the message brings about no actions. When the expanded group call facility is eliminated, the expanded group call table is emptied. The mobile communication system then transmits an acknowledgment message to the terminal equipment. The acknowledgment is positive if the expanded group call facility has been eliminated, and negative if no elimination has been performed.

Both in radio phones operating in accordance with the prior art and in radio phones operating according to the first embodiment of the invention, the number of the dispatcher group and the number of the expanded group call group are programmed into the memory.

The implementation according to the second embodiment, of the invention is described below. In this embodiment mobile stations still call their own dispatcher numbers (for example in area 1 in FIG. 2: number R1, etc). Within the entire expanded group call area, the mobile communication system establishes a combined expanded group call to which all dispatcher groups of different areas (AREA 1, AREA 2, AREA 3) are commanded. In FIG. 2, if the mobile station 222 wants to communicate with the other mobile stations, the dispatcher or other participants, such as fixed network subscribers, of a group call, within the entire expanded group call area, it dials the number R2. The mobile communication system then sets up a combined group call in the entire expanded group call area, the group call groups R1, R2 and R3 being commanded to this call. In this embodiment, the only number that has to be programmed into the radio phones is the number of their own dispatching area. Changing dispatching areas is thus easy and the mobile stations can always call the same dispatcher number. Therefore the users of the mobile stations do not need to know the expanded group call identifier or the time the expanded group call must be requested, but the mobile communication system attends to these tasks.

The activation of the expanded group call facility according to the second embodiment of the invention is described below in detail. A mobile station, a control point or some other terminal equipment connected to the mobile communication system transmits to the system a message to activate the expanded group call facility. This message contains at least the following fields:

1. the identifier of the calling party,
2. a message identifier indicating that the message concerns the activation of the area group call facility, and
3. a list of group call numbers covered by the expanded group call facility.

The mobile communication system then interprets the received message. If the calling party has the right to activate the expanded group call facility and all the group call numbers exist and can be connected to the expanded group call facility, the mobile communication system activates the facility. Otherwise, the message brings about no actions or it causes a negative acknowledgment to be sent. In the activation, the groups mentioned in the expanded group call message are stored in the expanded group call set-up table. The mobile communication system transmits an acknowledgment message to the terminal equipment. The acknowledgement is positive if the expanded group call facility is activated, and correspondingly negative if no activation has been performed.

The operation of the expanded group call facility according to the second embodiment of the invention is described below. A radio phone or some other terminal equipment transmits to the mobile communication system a group call set-up request for a desired group. The mobile communication system then interprets the received message and checks whether the group call identifier contained in the received message (call) is stored in the expanded group call set-up table. If it is not, operation continues as usual and only the group that was requested is formed. If the group call group identifier is found from the aforementioned table, the mobile communication system interprets the operation area of the expanded group call on the basis of the table. It is a union of the group call areas of all groups in the night dispatching table, i.e. the expanded group call set-up table. The system also examines which group calls must be called to the expanded group call to be established. The mobile communication system reserves one traffic channel within the operation area of the entire expanded group call. The mobile communication system commands the first group onto this channel in accordance with the expanded group call table. The mobile communication system then commands the rest of the groups, one by one, onto the same traffic channel, i.e. to the same call. All the groups mentioned in the expanded group call table are then in the same call within the operation area of the expanded group call group.

The elimination of the expanded group call facility according to the second embodiment of the invention is described below. In the method, a mobile station, a control point or some other terminal equipment of the mobile communication system transmits to the system a message to eliminate the expanded group call facility. This message contains at least the following fields:

1. the identifier of the calling party,
2. a message identifier indicating that the message concerns eliminating the area group call facility, and
3. a list of group numbers covered by the expanded group call facility.

The mobile communication system then interprets the received message. If the calling party has the right to eliminate the expanded group call facility and the group numbers are identical with the groups numbers in the expanded group call set-up table, the mobile communication system eliminates the expanded group call facility. Otherwise, the message brings about no actions. When the expanded group call facility is eliminated, the expanded group call table is emptied for the group call group in question. The mobile communication system then transmits an acknowledgment message to the terminal equipment. The acknowledgment is positive if the expanded group call facility has been eliminated, and correspondingly negative if no elimination has been performed.

Figure 5:
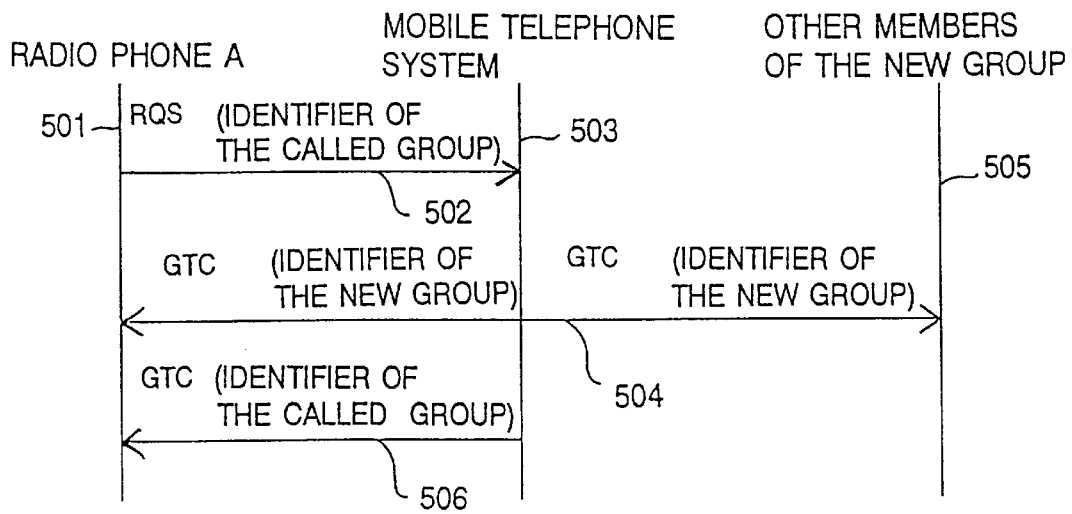
FIG. 5 is a functional diagram of the method according to the invention for establishing an expanded group call in a mobile communication system wherein the mobile station initiating the call operates in such a way that it requires its own go-to-channel command to contain the identifier of the group call group the mobile station was calling.

The implementation of the above-described embodiments of the invention in modern mobile telephone systems is described below with reference to FIG. 5. The background of the matter is disclosed for example in MPT Standard 1327, Chapter 9, especially Item 9.2.1.2.d, and Chapter 5.4. According to the MPT Standard 1327 describing analog radio phone networks, the signalling between the radio phone A initiating the call, the mobile communication system, and the radio phone B receiving the call corresponds to FIG. 5. It is natural that the method and system according to the invention can also be implemented in digital mobile telephone systems.

When the mobile station 501 has requested 502 call set-up from the mobile telephone system 503 with the message RQS, the mobile station 501 accepts only such a go-to-traffic-channel command GTC 504 that contains the identifier of the requested call, i.e. the identifier of the group call or call the mobile station 501 requesting the call has placed in its own request 502. In case of an expanded group call, the prior art system only transmits a go-to-traffic-channel message wherein the identifier is the number 504 of the combined dispatching area. In such a case, all other mobile stations 505, except the one 501 making the call, go to the channel assigned for the call. The calling mobile station 501 does not accept a go-to-channel command having a different identifier than the request 502, and therefore the other mobile stations 505 go to the channel assigned for the call. This additional problem is solved according to the invention by transmitting, within the area of the expanded group call, a go-to-channel command GTC containing the identifier of the new call and, in the area of the base station of subscriber A, a separate additional go-to-channel command 506 having the identifier of the group the first mobile station 501 originally called to the group call. In this manner, all the desired phones will participate in the same call. It must be noted that the above-described go-to-channel commands containing the identifiers of the new group 504 and the called group 506 may also be transmitted in a different order.

Figure 6:
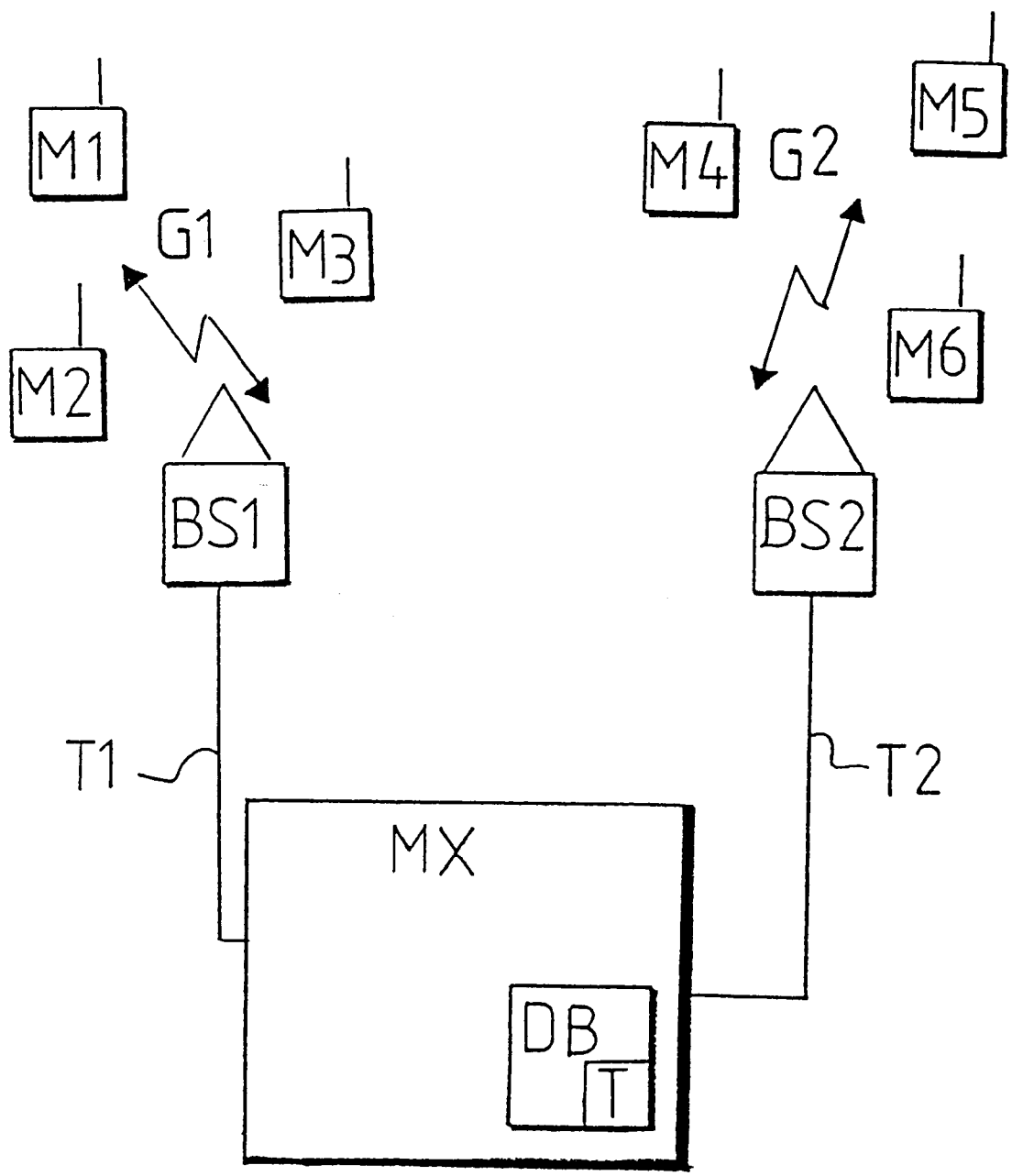
FIG. 6 is a block diagram of the mobile communication system according to the invention.

FIG. 6 is a block diagram of the mobile communication system according to the invention. In the figure, mobile stations M1, M2, M3 form a group call group G1 and mobile stations M4, M5, M6 form a group call group G2.

The figure shows a network infrastructure comprising one exchange MX, two base stations BS1, BS2 and the telecommunication connections T1, T2 between them. The exchange MX comprises a group call database DB for maintaining data concerning group calls. It must be noted that the database may also be placed in some other part of the network infrastructure. The group call database according to the invention also comprises an expanded group call set-up table T.

The figures and the description related thereto are only intended to illustrate the inventive idea. The details of the mobile communication system and the method according to the invention for establishing an expanded group call in a mobile communication system may vary within the scope of the claims. Even though the invention is described above mainly in connection with trunked mobile communication systems, the invention can also be used in other kinds of mobile communication systems.

We claim:

1. A method for establishing an expanded group call in a mobile communication system which has a plurality of group call groups each formed of a plurality of mobile stations, and a network infrastructure which includes at least one exchange, a plurality of base stations, telecommunication connections between the at least one exchange and respective ones of said base stations, and a group call database for maintaining data concerning group calls, said method comprising the steps of:

activating an expanded group call set-up facility concerning a first said group call group in said group call database, the expanded group call set-up facility expanding a group call to concern at least one other said group call group, as an expanded group call to be established;

said network infrastructure receiving a group call set-up request concerning said first group call group;

said network infrastructure checking from said group call database whether an expanded group call set-up facility has been activated for said first group call group;

said network infrastructure noticing from said group call database that the expanded group call set-up facility has been activated for said first group call group;

said network infrastructure calling those of said mobile stations which form said first group call group, to said expanded group call to be established and said network infrastructure calling those of said mobile stations which form said at least one other group call group, to said expanded group call to be established; and said network infrastructure establishing said expanded group call, by guiding those of said mobile stations which form said first group call group and those of said mobile stations which form said at least one other group call group all to communicate on one traffic channel each via a respective said base station servicing any said mobile station serving any said mobile station which is to participate in said expanded group call.

2. The method according to claim 1, further comprising:

in connection with actuating said expanded group call set-up facility concerning said first group call group establishing, an expanded group call set-up table, in which table an identifier of said expanded group call group to be established is provided, which corresponds to an identifier of said first group call group.

3. The method according to claim 2, wherein:

said calling of respective ones of said mobile stations to join said expanded group call to be established is performed by searching in said expanded group call set-up table for said identifier of said expanded group call group to be established corresponding to said identifier of the first group call group; and said guiding includes, by transmitting a group call request containing said identifier of said expanded group call group to be established, said network infrastructure causing the respective said mobile stations to move to said one traffic channel, and thereby to said expanded group call, in response to receiving said identifier of said expanded group call group.

4. The method according to claim 3, wherein:

said calling of the respective ones of said mobile stations to said expanded group call to be established is performed in such a way that, in addition to said identifier of said expanded group call group corresponding to said identifier of said first group call group in said expanded group call set-up table being transmitted, said guiding including transmitting a group call set-up request provided with said identifier of said first group call group.

5. The method according to claim 1, further comprising:

in connection with activating said expanded group call set-up facility concerning said first group call group establishing an expanded group call set-up table, in which table identifiers of all other group call groups of said at least one other group call group the mobile stations of which are to be included in said expanded group call when said expanded group call is established, correspond to said identifier of said first group call group, whereupon when said network infrastructure has received said group call set-up request concerning said first group call group, said calling is practiced so as to call those of said mobile stations which form said first group call group and those of said mobile stations which form said other group call groups having identifiers corresponding to said identifier of said first group call group onto said one traffic channel, and thereby to said expanded group call.

6. The method according to claim 5, wherein:

said calling of respective ones of said mobile stations to join said expanded group call to be established is performed by transmitting to respective ones of said mobile stations, one after another, respective group call go-to-channel message containing identifiers of the respective ones of said group call groups corresponding to said identifier of said first group call group in said expanded group call set-up table, said network infrastructure thereby causing the respective said mobile stations of said first and respective other said group call groups to move onto said one traffic channel and to join said expanded group call in response to receiving said identifiers of the respective ones of said group call groups corresponding to said identifier of said group call group.

7. The method according to claim 5, wherein:

said calling of respective ones of said mobile stations to join said expanded group call to be established is performed by transmitting to respective ones of said mobile stations, at least one group call go-to-channel message, each containing said identifier of said first group call group, said network infrastructure thereby causing the respective said mobile stations of said first group call group to move onto said one traffic channel and to join said expanded group call in response to receiving the said identifier.

8. The method according to claim 6, wherein:

said calling of respective ones of said mobile stations to join said expanded group call to be established is performed by transmitting to respective ones of said mobile stations at least one group call go-to-channel message, each containing said identifier of said first group call group, said network infrastructure thereby causing the respective said mobile stations of said first group call group to move onto said one traffic channel and to join said expanded group call in response to receiving the respective said identifier.

9. A mobile communication system, comprising:

a plurality of mobile stations forming a plurality of group call groups;

a network infrastructure, comprising:
  at least one exchange,
  a plurality of base stations served by said at least one exchange,
  telecommunication connections between said at least one exchange and respective ones of said base stations, and
  a group call database for maintaining data concerning group calls;

an expanded group call set-up facility concerning a first group call group said group call database, said facility being arranged to be actuated for extending a group call to concern at least one other group call group, as an expanded group call to be established;

said network infrastructure being adapted to check, in response to receiving a group call set-up request concerning said first group call group, whether an expanded group call set-up facility has been activated for the first group call group, and if so, to call those of said mobile stations which form said first group call group and those of said mobile stations which form at least one other group call group, to the expanded group call to be established; and said network infrastructure being adapted those of said mobile stations which form said first group call group and those of said mobile stations which form said at least one other group call group all to communicate on one traffic channel each via a respective said base station serving any said mobile station which is to participate in said expanded group call.

10. The mobile communication system according to claim 9, wherein: said group call database comprises an expanded group call set-up table wherein an identifier of said expanded group call group to be established corresponds to an identifier of said first group call group.

11. The mobile communication system according to claim 9, wherein:

said group call database comprises an expanded group call set-up table wherein identifiers of all other group call groups of said at least one group call group, the respective mobile stations forming which are to join said expanded group call, correspond to an identifier of said first group call group.

* * * * *